(No Model.)
T. BERRY.
STACKER.
No. 398,934. Patented Mar. 5, 1889.
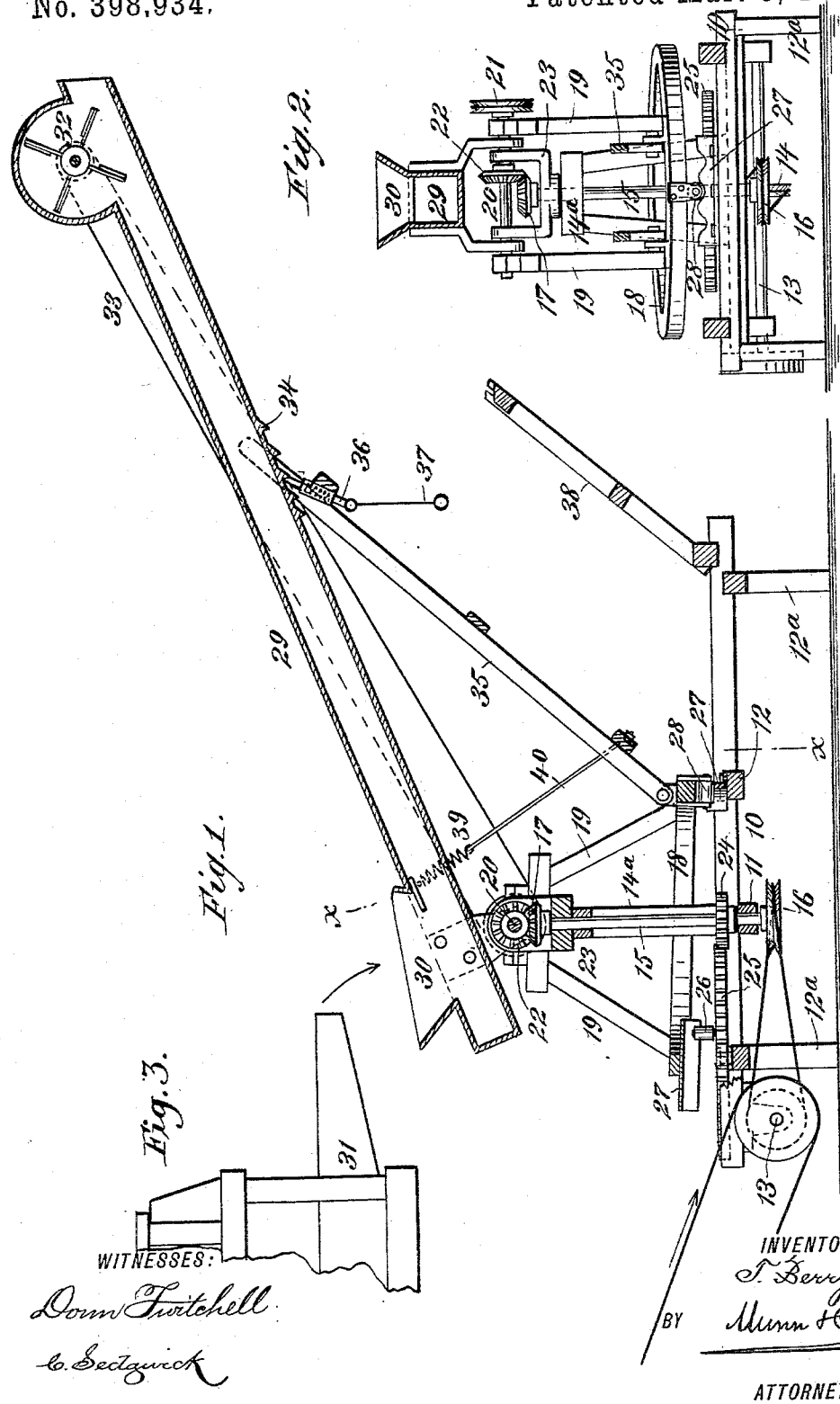
WITNESSES:
Donn Twitchell
C. Sedgwick
INVENTOR:
T. Berry
BY Munn & Co.
ATTORNEYS.

UNITED STATES PATENT OFFICE.

THOMAS BERRY, OF NORTH FORK, KENTUCKY.

STACKER.

SPECIFICATION forming part of Letters Patent No. 398,934, dated March 5, 1889.

Application filed October 16, 1888. Serial No. 288,206. (No model.)

*To all whom it may concern:*

Be it known that I, THOMAS BERRY, of North Fork, in the county of Mason and State of Kentucky, have invented a new and Improved Straw-Stacker, of which the following is a full, clear, and exact description.

My invention relates to an improvement in stackers, and has for its object to provide an implement of simple and durable construction, wherein a vibrating and a vertical motion will be imparted to the trunk, and wherein, also, the straw or hay will be continuously conveyed from the thrashing-machine and deposited a distance in advance of the trunk in a semicircular rick.

The invention consists in the construction and combination of the several parts, as will be hereinafter fully set forth, and pointed out in the claims.

Reference is to be had to the accompanying drawings, forming a part of this specification, in which similar figures of reference indicate corresponding parts in all the views.

Figure 1 is a central vertical section through the implement, and Fig. 2 is a transverse section on line $x\ x$ of Fig. 1. Fig. 3 is a detail view representing the rear or exit end of a thrashing-machine.

In carrying out the invention the frame 10 is preferably rectangular, consisting of suitable side and end pieces and intermediate cross-pieces, 11 and 12. In the rear of the frame, which is supported above the ground by legs $12^a$, or in any other approved manner, the drive-shaft 13 is journaled and provided with a pulley, 14, at or near the center, and a second pulley at one end, which latter pulley is belted to any suitable motor.

From the intermediate cross-bar, 11, standards $14^a$ are upwardly projected and connected by a suitable cross-head, and in the said cross-head and central cross-bar a perpendicular shaft, 15, is journaled, having attached to the lower extremity a horizontal pulley, 16, belted to the drive-shaft pulley 14, and a bevel-gear, 17, secured upon the upper end.

Above the frame 10 a table, 18, is supported, shaped to the contour of a ring and surrounding the perpendicular shaft 15. Upon the upper face of the table, at each side of the center, a truss, 19, is rigidly secured, in the upper end of which trusses a shaft, 20, is transversely journaled, as best shown in Fig. 2.

The shaft 20 is provided with a pulley, 21, upon one end and a bevel-gear, 22, meshing with the gear 17 upon the perpendicular shaft. The arms of a yoke, 23, are pivoted upon the transverse shaft within the trusses, and the said perpendicular shaft 15 is made to loosely pass through the body of the yoke, which body rests upon the cross-head of the base-frame standards $14^a$. Through the medium of the said yoke the table 18 is permitted to revolve around the perpendicular shaft. A vibrating motion is imparted to the table 18, the perpendicular shaft acting as a center, by a pinion, 24, secured upon the latter, meshing with a large spur-wheel, 25, pivoted upon the base-frame, as best shown in Fig. 1. The said spur-wheel is provided with an eccentrically-located friction-roller, 26, traveling intermittently in contact with a plate secured transversely to the under side of the table, which plate is preferably U-shaped in cross-section. A vertical rocking motion is also imparted to the table by securing upon the intermediate cross-bar, 12, a traveler-block, 27, having an undulating upper surface, and the attachment of a roller, 28, to the under face or side of the said circular frame, adapted for contact with the said block, as best illustrated in Fig. 2. The lower end of an air-tight trunk, 29, is pivoted at or near the inner end upon the transverse shaft 20, open at the outer end for the delivery of the material, and provided at or near the inner end with a hopper, 30, for the reception of said material as the same is dropped from the delivery-chute of the thrashing-machine 31. The material is drawn from the hopper by suction through the medium of a fan, 32, located within the trunk near the outer end, as illustrated in Fig. 1. The fan is driven by a belt, 33, passing over the pulley 21 upon the transverse shaft 20.

At or near the center of the trunk, upon the under side, a series of teeth, 34, are formed, and at the base of the trusses 19 a supporting-frame, 35, is hinged to table 18 and adapted to extend upward in contact with the trunk, and in the upper cross-bar of the said frame a spring-latch, 36, is located, engaging the teeth 34 and manipulated by an attached cord or wire, 37.

It will be observed that the vibratory and vertical movement of the table is communicated by the pinion 24 to the trunk, causing the material as delivered to drop over a semicircular area.

It is evident that while the material can be distributed over a semicircular area by the vibratory movement of the trunk in a horizontal plane only the delivery is greatly augmented by the vertical reciprocating movement imparted to the trunk by the undulating block 27 and the contacting roller 28, and the said latter movement tends to shake or jar the material and impart thereto a tendency to fly outward. This movement is especially desirable when the horizontal vibratory movement is very slow or measured, the object of the horizontal movement being primarily to distribute the material in a semicircle, as aforesaid.

At the forward end of the base-frame a detachable rest, 38, is located, purposed to afford a bearing for the supporting-frame when the trunk is lowered. The rest-frame is removed when the trunk is folded down upon the base-frame.

The supporting-frame 35 is held in normal engagement with the trunk by springs 39, attached to the latter, and arms 40, connecting the springs with the frame.

I desire it to be understood that I do not confine myself to the location of the fan illustrated in Fig. 1, as the said fan may be placed at any desired point between the hopper and the upper extremity of the trunk.

Having thus described my invention, what I claim as new, and desire to secure by Letters Patent, is—

1. In a stacker, the combination, with a base-frame, of a vibratory and vertically-rocking table mounted on the base and a trunk mounted upon the said table, substantially as described.

2. In a straw-stacker, the combination, with a base-frame and a table mounted thereon capable of a simultaneous horizontal vibratory and a vertical movement, of a vertically-adjustable trunk mounted upon said table, and means, substantially as shown and described, for adjusting the trunk, as and for the purpose specified.

3. In a straw-stacker, the combination, with a base-frame and a table capable of a horizontal vibratory and a vertical movement, of a trunk pivoted upon the table, provided with teeth integral with the under side, a spring-actuated supporting-frame hinged to the table, and a spring-actuated latch located upon the supporting-frame engaging with the teeth of the trunk, substantially as shown and described.

4. The combination, with a base-frame, a vertical drive-shaft, a table mounted upon said base, provided with a friction-roller at one side and a guide-plate upon the opposite side, of a spur-wheel rotated from the drive-shaft, a roller eccentrically located upon the said wheel, an undulating block secured to the base-frame adapted for contact with said roller, a trunk pivoted upon the table, and a spring-actuated supporting-frame hinged to the table and engaging with the trunk, substantially as shown and described.

5. In a straw-stacker, the combination of a vibratory and vertically-rocking trunk having an open outer end and provided with a hopper at its inner end, and an exhaust-fan arranged in said trunk, substantially as herein shown and described.

6. The combination, with a base-frame, a vertical shaft journaled in said base-frame, a wheel journaled upon the frame provided with an eccentric-pin, and a block having an undulating surface fixed on the frame, of a table suspended upon said shaft, a guide-plate and a friction-roller on said table, a horizontal shaft journaled in the frame of the table, a straw-elevator carried on the frame of the table, and operating-gearing, substantially as shown and described.

THOMAS BERRY.

Witnesses:
G. F. BATEMAN,
J. BOLINGER.